Sept. 15, 1970 J. B. URBAN 3,528,448
SLURRY VALVE
Filed Oct. 4, 1967 4 Sheets-Sheet 1
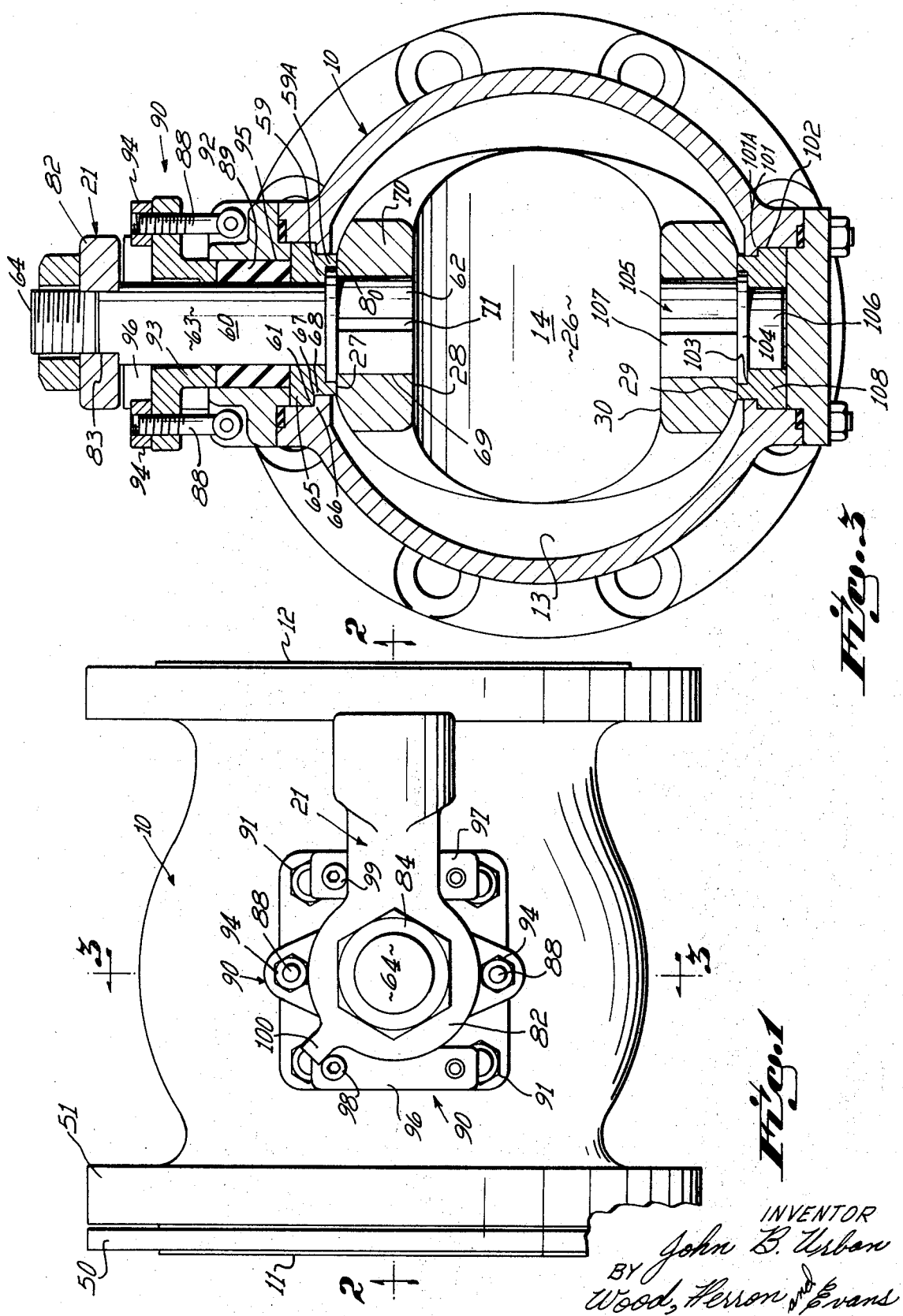
INVENTOR
John B. Urban
BY
Wood, Herron & Evans
ATTORNEYS

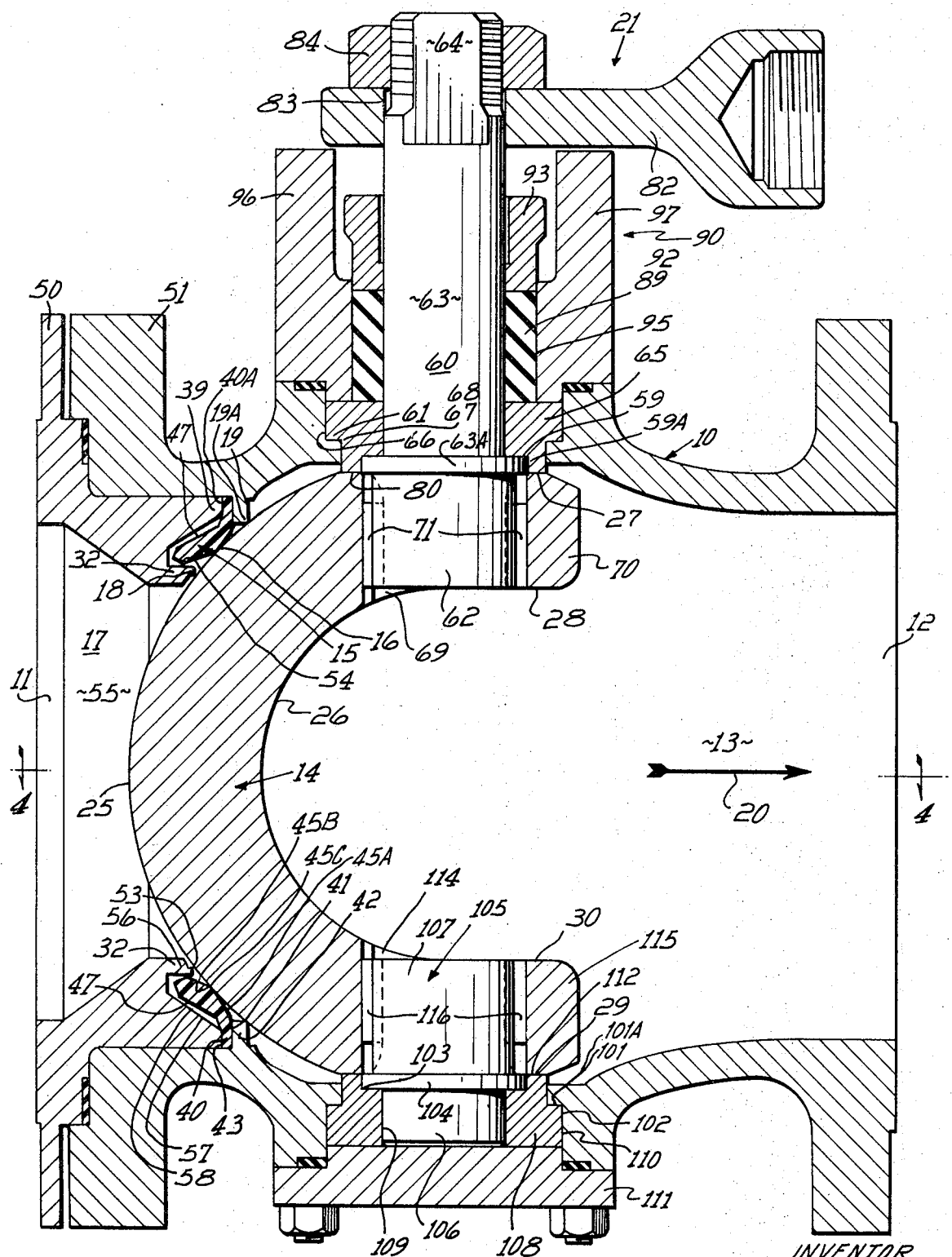

INVENTOR
John B. Urban
BY
Wood, Herron & Evans
ATTORNEYS

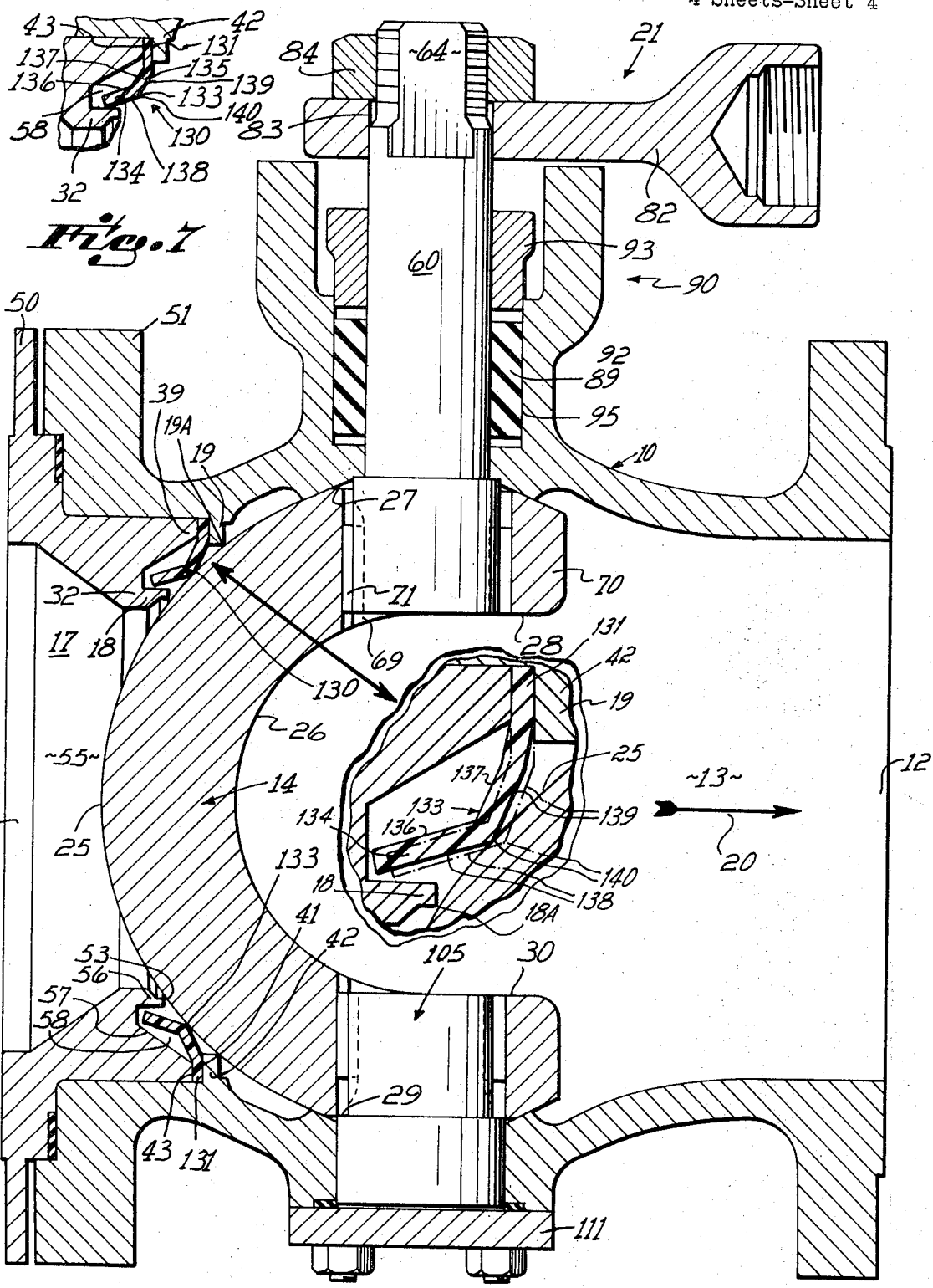

United States Patent Office 3,528,448
Patented Sept. 15, 1970

3,528,448
SLURRY VALVE
John B. Urban, Cincinnati, Ohio, assignor to The Lunkenheimer Company, Cincinnati, Ohio, a corporation of Delaware
Filed Oct. 4, 1967, Ser. No. 672,767
Int. Cl. F16k 5/16
U.S. Cl. 137—242　　　　　　　　　　　　　　9 Claims

ABSTRACT OF THE DISCLOSURE

A valve is disclosed which is adapted to be used in controlling the flow of slurries, that is, fluids containing small insoluble particles which become deposited on exposed valve components and thereby form a scale. The valve includes a ball section mounted in a cavity formed in the valve body which when rotated controls flow through the valve, at least one stationary scraping member formed in the cavity and cooperating with the valve ball surface to effect removal of scale deposited by the slurry when the ball section is rotated to effect valving action, a removable resilient annular valve seat located in the valve inlet port which has its inner margin biased into yieldable contact with the valve ball surface by the slurry in the inlet port, permitting the seat to conform to the ball contour and produce a fluid-tight seal, and a removable valve seat retainer for clamping the valve seat in operative position when the valve is connected in a slurry pipeline.

---

This invention relates to fluid valves and more particularly to fluid valves suitable for use in controlling the flow of slurries such as bauxite slurries produced in the refinement of alumina.

In refining alumina, particularly in accordance with the Bayer process, slurries are produced at various stages which pose formidable problems with respect to the design of fluid handling equipment. The problems are attributable to the tendency of the insoluble particles in the slurries to deposit and form a scale on the fluid handling apparatus utilized in conveying and controlling the slurry flow. The scale formation problem is particularly acute in valving equipment where moving part clearances and valve seat smoothness must be maintained to insure free valve operation and proper valve seating.

The prior art proposals for obviating the scale problem are generally remedial in nature rather than preventive. In accordance with these prior art proposals, the valve members, such as seats, upon which scale deposits have accumulated, are periodically reground and the accumulated scale removed. The disadvantage of this practice is that periodic grinding operations are necessary, and such grinding operations are both time consuming and expensive.

It has been a principal objective of this invention to provide a valve suitable for use with slurries which minimizes the accumulation of scale on the valve seat, and thereby eliminates the need for frequent regrinding operations. This objective has been accomplished in accordance with certain of the principles of this invention by employing a fundamentally different concept in slurry valve design which involves the use of a unique ball valve having at least one stationary internal scraping member formed in the interior of the ball valve which cooperates with the surface of the movable valve ball for scraping scale therefrom as the ball moves in the course of producing routine valving action. In operation, rotation of the valve ball to regulate the flow pattern of the valve produces relative scraping movement between the stationary scraping member and the moving valve ball surface and thus effects scale removal. Hence, actuation of the valve produces simultaneous scale removal as well as valving action.

In a preferred form of this invention the valve ball is a unitary section of a ball, and the valve outlet port sufficiently large to accommodate passage of the ball therethrough. With a valve so designed, the ball can be operatively positioned within, or removed from, the valve body to effect assembly or disassembly, respectively, without resort to more expensive multi-part valve bodies or segmented valve balls typically found in many of the prior art ball valve proposals.

Thus, a slurry valve is provided which, in addition to having the automatic de-scaling feature noted previously, is also compact and of unitary ball and body construction, all of which enhance the economies of valve fabrication, use and maintenance. In addition, with a valve so designed, a smaller valve body can be used for a given diameter valve since the additional size otherwise necessary for accommodation of a conventional spherical ball is unnecessary with the smaller ball section.

It has been a further and equally important objective of this invention to provide a slurry valve having an improved construction which renders the valve seat both easily removed and easily inserted and maintained in operative position for use. This objective has been achieved in accordance with certain additional principles of this invention by incorporating into a ball valve a unique combination of elements including a novel valve seat and seat retainer which cooperate in a highly unobvious and fundamentally different manner to permit easy assembly and disassembly. More specifically, the valve seat is selectively removable, resilient, and generally annular in configuration, and includes a wide outer positioning rim and an inner sealing rim. The seat retainer, which is also selectively removable, includes an external flange and inner clamping rim.

To assemble, the seat is inserted into the inlet port of the valve body with one side of the positioning rim of the seat in contact with an internal shoulder formed in the valve body and the sealing rim of the seat in contact with the ball. With the seat so positioned, the seat retainer is inserted into the valve inlet port, allowing its inner clamping rim to engage the other side of the positioning rim, sandwiching the seat in operative position. This sandwiching action is maintained when the valve is connected in the fluid line by reason of the external flange of the seat retainer which itself becomes sandwiched between the valve body and the line, effectively clamping the valve seat in position. Disassembly is effected by reversal of the above procedure.

Other objectives and advantages of this invention will be more readily apparent from a detailed description of the invention taken in conjunction with the accompanying drawings in which:

FIG. 1 is a top plan view of a preferred embodiment of the slurry valve of this invention.

FIG. 2 is a cross-sectional view taken along lines 2—2 of FIG. 1.

FIG. 3 is a cross-sectional view taken along lines 3—3 of FIG. 1.

FIG. 6 is an elevational view in cross-section of a modification of the slurry valve of this invention.

FIG. 7 is an enlarged view of the valve seat depicted in the modified valve of FIG. 6, showing the seat in an undeflected condition.

Figure 4:
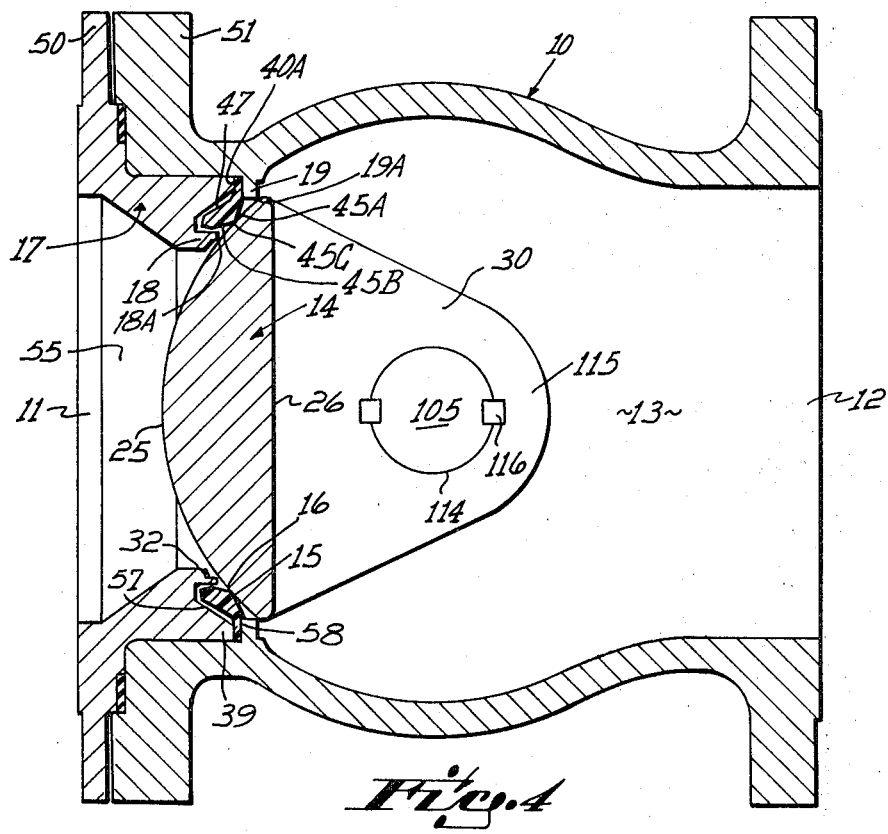
FIGS. 4 and 5 are cross-sectional views taken along lines 4—4 of FIG. 2 showing the ball section in sealing and nonsealing relationship, respectively, to the valve inlet port.

A preferred embodiment of the slurry ball valve embodying the various concepts of this invention includes, as shown in particular in FIGS. 1–3, a valve body 10 having a central internal cavity 13 which communicates at opposite sides with an inlet port and an outlet port formed in the body and indicated generally by the reference numerals 11 and 12, respectively. The ports 11 and 12 are connectable in use to upstream and downstream pipe sections (not shown) of a conventional slurry-conveying fluid pipeline. A selectively rotatable ball section 14 is rotatably mounted in the cavity 13. Positioned within the inlet port 11 and cooperating with the ball section 14 is a resilient tapered valve seat 15 held in place by a seat retainer 17. The seat 15 has an inner marginal sealing rim 16 which is exposed to the upstream pressure of the slurry for pressure biasing the sealing rim downstream against the ball section 14 in the direction of the slurry flow indicated by arrow 20.

The valve further includes two internal scraping members indicated generally by the reference numerals 18 and 19 which are positioned within the cavity 13 in scraping contact with the ball section 14. The scraping members 18 and 19 function to remove accumulations of scale deposited by the slurry when the ball section 14 is moved relative to the scraping member to effect valving motion. A selectively rotatable manual actuator 21 connected to the ball section 14 is provided for rotating the ball section to simultaneously regulate the flow through the valve and remove scale accumulations from the surface of the ball section. The actuator is rotatable between a first position depicted in FIG. 4 and a second position depicted in FIG. 5. In the first position the ball section 14 is disposed in seating contact with the pressure biased sealing rim 16 of the tapered valve 15 for preventing flow between the inlet port 11 and the outlet port 12 in the direction of arrow 20. In the second position the ball section is angularly displaced from the first position to a position wherein the seat sealing rim 16 is in nonseating contact with the ball section to permit flow between the inlet and outlet ports.

Considered in more detail, the ball section 14 is seen to be configured in the form of a quarter section of a hollow oblate spheroid defined by exterior and interior surfaces 25 and 26, respectively. The exterior surface 25 of ball section 14 is substantially spherical in shape except for upper and lower flattened portions 27 and 29, respectively. The exterior surface 25 of the ball section 14 is dimensioned such that when the ball section is in the closed position depicted in FIG. 4, the exterior surface 25 is in seating contact with the valve seat 15 throughout the entire extent of the inner seal rim 16, completely sealing inlet port 11. The interior surface 26 of the ball section 14 is substantially cylindrical in shape except for upper and lower flattened portions 28 and 30, respectively. The interior surface 26 of the ball section 14 is dimensioned such that when the ball section is in the open position shown in FIG. 5, the interior surface 26 is substantially coplanar with the small diameter or necked portion 32 of the seat retainer 17, thereby permitting substantially unobstructed flow from the inlet port 11 to the cavity 13.

The dimensions and configuration of port 12 are selected such that the ball section 14 may pass through the port. Dimensioning and configuring the outlet port 12 in the manner described permits the ball section 14 to be inserted through the port and operatively positioned in the cavity 13 without providing either special access openings in the valve body designed solely to permit insertion and withdrawal of the ball sections or multipart ball section or valve body construction, both of which materially increase the cost of the valve as well as the time required for assembly and disassembly. The dimensions of port 11 are such that the ball section 14 is larger than the port. This permits proper seating.

The tapered valve seat 15 includes the inner seal rim 16, as indicated previously, which is generally conical in shape and an outer marginal or positioning rim 40 having a generally annular configuration. The outer rim 40 of the seat 15 is clamped between a seat-engaging surface or shoulder 41 constituting one side of an internal flange 42 found in the cavity 13 and a seat-engaging surface 43 formed on a clamping ring 39 constituting an integral portion of the seat retainer 17. The inner sealing rim 16 of the seat 15 includes an inner conical surface 45A and an outer conical surface 45B, the intersection 45C of which is adapted to engage in sealing contact with the exterior surface 25 of the ball section 14 when the latter is in the closed position depicted in FIG. 4. The inner sealing rim 16 further includes a generally conical surface 47. In use, the surface 47 and a surface 40A of rim 40 are in communication with fluid in the inlet port 11, and are subjected to the pressure of the slurry in the inlet port 11 and as a consequence thereof are resiliently biased downstream in the direction of flow 20, yieldably urging the sealing rim 16 against the exterior surface 25 of the ball section 14. The tapered valve seat 15 may be constructed of a variety of conventional resilient valve-seat materials. One resilient valve-seat material found to be satisfactory is tetrafluoroethylene marketed by E. I. du Pont de Nemours Co. under the trademark Teflon.

The seat retainer 17, as indicated previously, includes a seat-engaging or clamping surface 43 having an annular shape, and an external flange 50. Clamping surface 43 urges the outer or positioning rim 40 of the seat 15 against the seat-engaging surface 41 of the internal flange 42 when the seat retainer 17 is urged in the direction of the arrow 20. This occurs when the upstream end of a slurry conveying pipe (not shown) is placed in contact with the external flange 50 formed on the periphery of the seat retainer 17 and urged toward a flange 51 formed on the valve body 10 adjacent the inlet port 11 by suitable fastening means such as bolts (not shown). The seat retainer 17 has a bore 55 necking down to the small diameter portion 32, and in practice defines the inlet port 11.

The seat retainer 17 further includes a lip 56 which in conjunction with the internal flange 42 formed on the body 10 an annular groove 57. The configuration and dimensions of the groove 57 are such as to provide a clearance space 58 exteriorly of the outer surface 47 of inner seal rim 16 to permit limited upstream motion of the seal rim 16. Such limited upstream motion of the inner seal rim 16 in the clearance space 58 permits the intersection 45C of surfaces 45A and 45B to follow and conform to the exterior surface 25 of ball section 14 which may develop an uneven contour due to nominal and unavoidable accumulations or deposits of scale produced by the slurry.

The clearance space 58, in addition to allowing the intersection 45C of surfaces 45A and 45B to limitedly move for conforming to the contour of the exterior surface 25 of the ball section 14, performs a further and equally important function. Specifically, the clearance space 58, which in use is in communication with the fluid in the inlet port 11, allows the upstream pressure of the slurry in the inlet port to be communicated to the surfaces 47 and 40A to urge the intersection 45C of surfaces 45A and 45B in a direction toward the exterior surface 25 of the ball section 14 as is necessary to provide a fluid tight seal between the intersection 45C of surfaces 45A and 45B of the inner seal rim 16 and the exterior surface 25 of the ball section. Maximum movement of the seal rim 16 in the general direction of arrow 20 occurs when the ball section 14 is in the open position depicted in FIG. 5, and is limited by abutment of the outer locating rim 40 of seat 15 against surface 41 of flange 42.

The scraping members 18 and 19, considered in more detail, comprise circular shearing edges or corners 18A and 19A formed on the lip 56 of the seat retainer 17 and the internal flange 42 of the valve body 10, respectively. The scraping members 18 and 19 are each spaced relatively to the exterior surface 25 of a properly positioned ball section 14 such that a clearance of approximately five one-thousandths of one inch (0.005") exists between their shearing edges 18A and 19A and the exterior surface 25 of the ball section 14 when no scale formation has accumulated on the exterior surface 25.

In operation, when the ball section 14 moves relative to the scraping members 18 and 19, any accumulations of scale on the surface 25 having a thickness in excess of the clearance provided between the scraping members and the exterior surface 25 of the ball section are removed by the shearing action of the edges 18A and 19A as the ball section 14 is rotated to vary the flow characteristics of the valve. Thus, undesirable scale deposits are removed simultaneously with valving action when the ball section 14 is rotated between the closed and open positions depicted in FIGS. 4 and 5, respectively. The actuator 21, considered in more detail, includes a valve stem 60 having a large diameter intermediate portion 63A and small diameter inner and outer end portions 62 and 63, respectively. The intermediate portion 63A and a section of the outer stem portion 63 are journaled and seated in a bearing 65 which has an internal shoulder 59 engaged with a shoulder 59A formed by the stepped diameter stem portions 63A and 63. The mating shoulders 59 and 59A axially position the stem 60 relative to the bearing 65. The bearing 65 has a stepped diameter outer surface 61 which seats in a similarly configured stepped diameter opening 66 formed in the valve body 10. The bearing surface 61 and the opening 66 have complimentary mating shoulders 67 and 68 to provide axial positioning of the bearing 65 relative to the valve body 10. The bearing 65 further includes a lower surface 80 which slideably contacts the upper surface 27 of the ball section 14 for positioning the ball section axially within the cavity 13.

The inner end 62 of the stem 60 is positioned within an opening 69 formed in the upper end 70 of the ball section 14. Both the inner end 62 and the opening 69 are axially slotted to receive keys 71 for preventing relative rotational motion therebetween. The extremity 64 of the stem 60 is adapted to engage a handle or control member 82 for rotating the stem 60 and thereby imparting valving and scraping motion to the ball section 14. To this end, the outer end 64 of the stem 60 is provided with a ribbed or cruciform cross-section which mates in a similarly configured opening 83 formed in the handle 82. A stem nut 84 threadable on the extremity 64 of the stem 60 secures the handle 82 to the stem.

A bonnet 90 having a central bore 95 surrounds the stem 60, and is secured in place by suitable bonnet bolts 91 (FIG. 1). The bonnet 90 locks the bearing 65 in its operative position in the body opening 66. In addition, the bonnet 90 facilitates the sealing of the stem and valve body by constraining packing 92 stuffed in an annular cavity 89 formed by the stem portion 63 and the bore 95. A gland 93 is received in the upper portion of bore 95. Gland 93 is forced inwardly by means of nuts 94 engaging bolts 88 to compress packing 92 and thereby provide an efficient seal between the stem 60 and bearing 65. The bonnet 90 further includes a pair of upstanding arms 96 and 97 provided with stops 98 and 99 (FIG. 1). The stops 98 and 99 cooperate with a lug 100 formed on, and radially extending from, the handle 82. The combination of the stops 98 and 99 and the lug 100 limit the rotational movement of the handle 82 and, hence, of the stem 60 and ball section 14, to an angular displacement of approximately 90° which is sufficient to rotate the ball section between the closed and open valve positions depicted in FIGS. 4 and 5, respectively.

Also supporting and locating the ball section 14 is a pin 105. The pin 105 is stepped in diameter having an outer small diameter end 106 and an inner large diameter end 107 separated by a shoulder 104. The stepped diameter portions 106 and 104 of the pin 105 seat and locate in a bearing 108 having a stepped diameter bore 109 complementing the stepped diameter pin portions 106 and 104. The stepped diameter bore 109 has an internal shoulder 103 which mates with external pin shoulder 104 to locate the pin 105 axially relative to the bearing 108. The bearing 108 has a stepped diameter periphery 110 which seats in a similarly stepped diameter opening 102 formed in the valve body 10. An external shoulder 101 formed in the periphery 110 of the bearing 108 engages an internal shoulder 101A formed in the opening 102, axially positioning the bearing 108 relative to the valve body 10. The bearing 108 further includes a surface 112 which slideably supports the lower end 115 of the ball section 14. A bearing retainer 111 secured to the valve body 10 locks the bearing 108 in its operative position in opening 102. The inner end 107 of the pin 105 fits within a bore 114 formed in the lower end 115 of the ball section 14. The bore 114 and the inner end 107 of the pin 105 are similarly slotted to receive keys 116 for preventing relative rotational motion therebetween.

In operation, the valve is inserted in a slurry pipeline the flow through which the valve is designed to control. Such insertion in the pipeline is accomplished by connecting the upstream end of the pipeline (not shown) to the valve body flange 51. This is effective to urge the flange 50 of the seat retainer 17 toward the body flange 51, in turn urging the surface 43 of the clamp ring 39 formed on the seat retainer 17 against the outer positioning rim 40 of the valve seat 15, to thereby clamp the valve seat in its operative position against the seat-engaging surface 41 of the internal flange 42. With valve seat so positioned the sealing rim 16 is engageable with the exterior surface 25 of the ball section 14 to seal port 11 from cavity 13 when the valve is in the closed position depicted in FIG. 4. Completion of the connection of the valve in the slurry pipeline (not shown) is effected by fastening a flange 51 formed in the body 10 and surrounding the outlet port 12 to the downstream end of the pipeline.

With the ball section 14 in the closed position as shown in FIG. 4, the valve is connected in the slurry pipeline, forcing the inner seal rim 16 against the exterior surface 25 of ball section 14 to provide a fluid tight seal between seat 15 and the ball section 14 preventing the flow of slurry from the inlet port 11 to the cavity 13 in the direction of arrow 20. The fluid pressure will enter the clearance space 58 formed by the groove 57 and the surfaces 47 and 40A of seat 15, adding additional force to urge the inner seal rim 16 against the outer surface 25 of ball section 14. The fluid pressure in clearance space 58 is effective to move the inner seal rim 16 downstream to a point limited by the engagement of the locating rim 40 of seat 15 against surface 41 of the shoulder 42 in body 10. Should the ball section 14 be in the open position depicted in FIG. 5, the fluid will flow through inlet port 11 and over the inner scraper 18 into the body cavity 13. As the fluid flows over the inner scraper 18, the fluid is diverted from impinging directly on the inner seal rim 16 of valve seat 15 thus preventing excessive wear of the seating surface. Inner seal rim 16 of valve seat 15 does not contact the exterior surface 25 of the ball section 14 when the ball section 14 is in the open position, and thus no sealing occurs.

Figure 5:
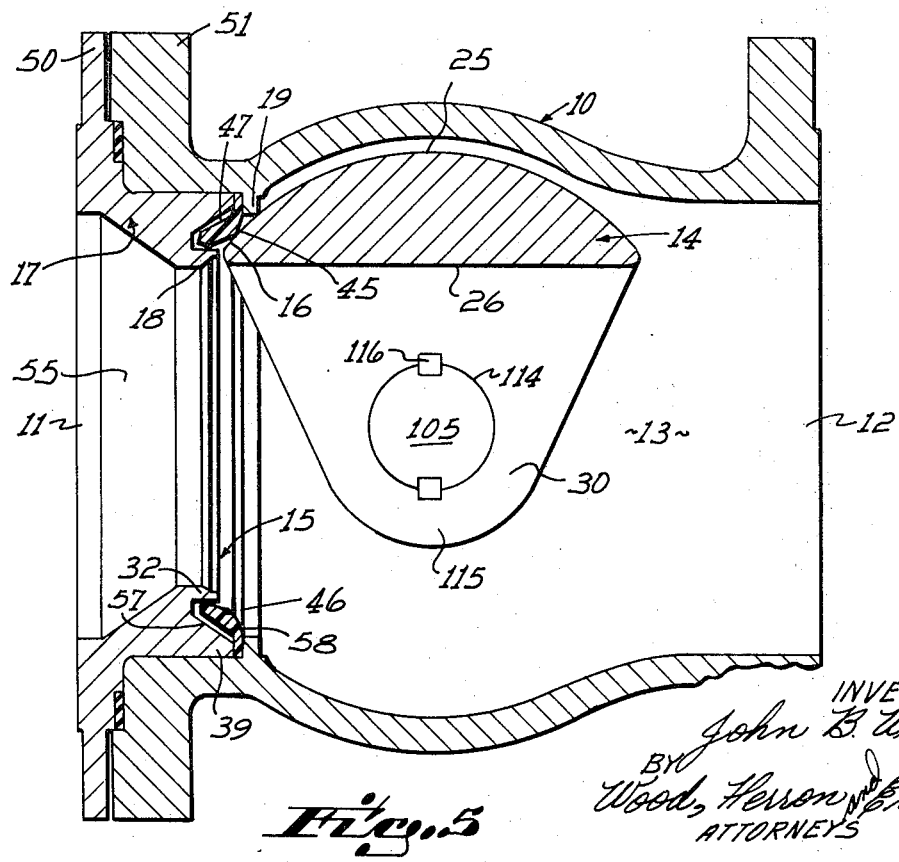

In the course of rotating the ball section 14 between the closed and open positions depicted in FIGS. 4 and 5, should the contour of surface 25 be uneven due to the presence of a nominal and unavoidable amount of scale, such as permitted by the clearance of 0.005 inch between the scraping members 18 and 19 and the surface 25, the biased inner seal rim 16 of the seat 15 moves normal to the exterior surface 25 of the ball section as is necessary to follow and conform to any unevenness that may exist in surface contour of the ball section. Thus, proper sealing between the seat 15 and the ball section results notwithstanding the existence of nominal scaling.

Simultaneous scale scraping and valving action is provided by rotating the handle 82. Rotation of the handle 82 imparts rotary motion via the stem 60 to the ball section 14. Depending upon the direction of rotation of the handle 82, the ball section rotates to either the closed position shown in FIG. 4 or the open position shown in FIG. 5, producing relative motion between the exterior surface 25 of the ball and the seat 15 and scraping members 18 and 19. The relative movement between the exterior surface 25 of the ball section 14 and the seat 15 produces valving motion as described previously. The relative movement between the ball section 14 and the scraping members 18 and 19 produces a shearing action in a manner also described previously to remove scale on the surface 25 exceeding in thickness an amount equal to the clearance provided between the shearing edges 18A and 19A of the scraping members 18 and 19 and the exterior surface 25 of a properly positioned ball section.

A modification of the embodiment of the valve depicted in FIGS. 1–5 is shown in FIGS. 6 and 7. Reference numerals identical to those appearing in FIGS. 1–5 are used to designate elements in FIGS. 6 and 7 which are identical to those depicted in FIGS. 1–5.

The modified valve depicted in FIGS. 6 and 7 is similar to the valve embodiment depicted in FIGS. 1–5 except for a difference in seat configuration and an absence of bearings for supporting the stem 60 and the pin 105. The seat of the embodiment depicted in FIG. 6 is generally indicated by the reference numeral 130, and includes an outer marginal portion or positioning rim 131 which is adapted to be clamped between the seat-engaging surfaces 43 and 41, respectively, formed on the seat retainer 17 and the flange 42. The valve seat 130 further includes an inner V-shaped sealing rim, generally indicated by the reference numeral 133, formed by annular sections 134 and 135. Annular sections 134 and 135 have outer surfaces 136 and 137 which are subjected to the pressure of fluid in the clearance space 58, and inner surfaces 138 and 139 which meet in a circular line 140 which engages the exterior surface 25 of the ball section 14.

The seat 131 is fabricated of resilient material and dimensioned and positioned relative to the exterior surface 25 of the ball section 14 such that when the seat and ball section are properly positioned in the valve body 10 and valve is in the closed condition, the sealing rim 133 is deflected. Upon deflection, the configuration of the seat 131 changes from that shown in FIG. 7 to that shown in FIG. 6. When valve seat 130 is deflected, the positioning rim 131 is pulled away from surface 41 on interval flange 42 projecting into cavity 13, and sealing rim 133 is deflected, expanded and tends to become slightly flattened in the area of the ball engaging line 140 providing an effective seal between seat 130 and ball section 14. Sealing action between the sealing rim 133 and the ball section 14 is assisted by the fluid pressure exerted on the surface 137 and positioning rim 131 in a manner similar to that as described in connection with the embodiment of FIGS. 1–5.

Having described my invention, I claim:

1. A valve suitable for controlling the flow of scale-forming slurries comprising:
    a body having an internal cavity spaced intermediate and in communication with an inlet port and an outlet port through which fluid flows in a specified direction,
    a ball section of unitary construction located in said cavity, said ball section being mounted for rotation about an axis thereof between open and closed positions, said ball section being configured substantially in the form of a quarter section of a hollow spheroid defined by
    (a) an exterior quarter spherical surface delineated by intersecting semi-circular arcs, said exterior surface being adapted to terminate fluid flow between said inlet and outlet ports when said ball section is in said closed position, and
    (b) an interior quarter surface delineated by intersecting circular arcs, said interior surface being adapted to permit unobstructed flow between said ports when said ball section is in said open position, said ball section being dimensioned relative to at least one of said ports to permit said ball section to be inserted through said port into operative position within said cavity when disposed with said axis parallel to said direction of flow,
    a resilient tapered valve seat having an outer marginal positioning rim engaged with the periphery of said inlet port and an inner marginal sealing rim disposed upstream of said outer rim and having an outer surface exposable to the upstream pressure of said slurry for pressure biasing the inner surface of said sealing rim downstream against the exterior surface of said ball section,
    a scraping member located in said cavity in scraping contact with said exterior surface of said ball section for scraping scale from said ball section when the latter is moved relative thereto, and
    an actuator for rotating said ball section to simultaneously regulate the flow through said valve and remove scale from said exterior surface of said ball section, said actuator being movable between a first position in which said exterior surface of said ball section is disposed in seating contact with said pressure biased sealing rim for preventing flow between said inlet and outlet ports and a second position in which said ball section is angularly displaced from said first position to permit flow between said inlet and outlet ports.

2. The valve of claim 1 further including a shoulder formed in said body surrounding said inlet port and a seat retainer, said shoulder and seat retainer each having a seat engaging surface substantially coextensive with said outer seat rim for clamping said outer seat rim therebetween when said seat retainer is urged toward said shoulder.

3. A valve suitable for controlling the flow of scale-forming slurries comprising:
    a body having an internal cavity spaced intermediate and in communication with an inlet port and an outlet port, said body being connectable in use in a slurry-conveying pipeline the flow in which is to be controlled,
    a ball section rotatably mounted in said cavity,
    a resilient tapered valve seat having an outer marginal positioning rim engaged with the periphery of said inlet port and an inner marginal sealing rim disposed upstream of said outer rim and having an outer surface exposable to the upstream pressure of said slurry for pressure biasing the inner surface of said sealing rim downstream against the exterior surface of said ball section,
    an internal flange formed in said cavity having first and second oppositely disposed surfaces, said first surface including a scraping member in scraping contact with said exterior of said ball section for scraping scale from said ball section when the latter is moved relative thereto, said second surface including a shoulder surrounding said inlet port and having a seat engaging surface,
    a seat retainer having a seat engaging surface substantially co-extensive with said outer seat rim for clamping said outer rim between said seat retainer and said shoulder when said seat retainer is urged toward said shoulder, and
    an actuator for rotating said ball section to simultaneously regulate the flow through said valve and remove scale from said exterior surface of said ball section, said actuator being movable between a first position in which said exterior surface of said ball section is disposed in seating contact with said pressure biased sealing rim for preventing flow between said inlet and outlet ports and a second position in which said ball section is angularly displaced from said first position to permit flow between said inlet and outlet ports.

4. The valve of claim 3 wherein said seat retainer includes a lip spaced from the seat engaging surface of said retainer and forming therewith an annular groove adapted to receive said sealing rim, said groove being in communication with said inlet port for receiving slurry to pressure bias said inner surface of said sealing rim against the exterior surface of said ball section.

5. The valve of claim 4 wherein said lip is in scraping contact with the exterior surface of said ball section for scraping scale from said ball section when the latter is moved relative thereto to effect routine valving action.

6. A valve comprising:
a body of unitary construction having an internal cavity spaced intermediate and in communication with an inlet port and outlet port between which fluid flows in a specified direction, said inlet and outlet ports having predetermined diameters, said valve body having a stem opening communicating with said cavity,
a ball section of unitary constructions located in said cavity, said ball section being mounted for rotation about an axis thereof between open and closed positions, said ball section being configured substantially in the form of a quarter section of a hollow spheroid defined by
(a) an exterior quarter spherical surface delineated by intersecting semi-circular arcs, the diameter of said arcs exceeding said predetermined diameters, said exterior surface being adapted to terminate fluid flow between said inlet and outlet ports when said ball section is in said closed position, and
an interior quarter surface delineated by intersecting circular arcs, said interior surface being adapted to permit unobstructed flow between said ports when said ball section is in said open position,
said ball section being dimensioned relative to said stem opening to prevent insertion of the ball section therethrough and dimensioned relative to at least one of said ports to permit said ball section to be inserted through said one port into operative position within said cavity only when disposed with said axis parallel to said direction of flow, and
a valve stem physically separable from said ball section and positionable within said stem opening to engage said ball section subsequent to insertion of said ball section within said cavity via said one port.

7. The valve of claim 6 wherein said actuator includes a stem having an inner end insertable into said cavity through an opening in said body for releasably engaging said ball section and an outer end projecting exteriorly of said body and engageable with a movable control member for rotating said stem and said ball section to effect simultaneous valving and scale scraping action.

8. The valve of claim 6 further including a pin insertable through a second body opening into a bore in said section located diametrically opposite said inner end of said stem for locating and rotatably supporting said ball section.

9. A valve suitable for controlling flow of scale-forming slurries comprising:
a unitary body having an internal cavity spaced intermediate and in communication with an inlet port and an outlet port through which flow is a specified direction, said body being connectable in use in a slurry-conveying pipeline the flow in which is to be controlled,
a ball section of unitary consrtuction located in said cavity, said ball section being mounted for rotation about an axis thereof between open and closed positions, said ball section being configured substantially in the form of a quarter section of a hollow spheroid defined by
(a) an exterior quarter spherical surface delineated by intersecting semi-circular arcs, said exterior surface being adapted to terminate fluid flow between said inlet and outlet ports when said ball section is in said closed position, and
(b) an interior quater surface delineated by intersecting circular arcs, said interior surface being adapted to permit unobstructed flow between said ports when said ball section is in said open position, said ball section being dimensioned relative to at least one of said ports to permit said ball section to be inserted through said port into operative position within said cavity when disposed with said axis parallel to said direction of flow,
a valve seat positioned for engaging the exterior surface of said ball section,
a scraping member located in said cavity in scraping contact with the exterior surface of said ball section for scrapiig scale from said ball section when the latter is moved relative thereto, and
an actuator for rotating said ball section to simultaneously regulate the flow through said valve and remove scale from the exterior surface of said ball section, said actuator being movable between a first position in which said exterior surface of said ball section is disposed in seating contact with said valve seat for preventing flow between said inlet and outlet ports and a second position in which said ball section is angularly displaced from said first position to permit flow between said inlet and outlet ports.

References Cited
UNITED STATES PATENTS

| | | | |
|---|---|---|---|
| 2,893,682 | 7/1959 | Hintzman | 251—173 |
| 2,974,921 | 3/1961 | Kaswan | 251—173 X |
| 2,988,320 | 6/1961 | Kent | 251—174 |
| 3,076,631 | 2/1963 | Grove | 137—242 X |
| 3,077,902 | 2/1963 | Vickery | 251—172 X |
| 3,181,834 | 5/1965 | Jennings | 251—174 X |
| 3,260,496 | 7/1966 | Borcherdt | 251—173 X |
| 3,339,887 | 9/1967 | Hutchens | 251—172 X |
| 2,803,426 | 8/1957 | De Zurik | 251—309 X |
| 3,064,940 | 11/1962 | Anderson | 251—309 X |
| 3,284,045 | 11/1966 | Kulisek | 251—309 X |

CLARENCE R. GORDON, Primary Examiner

U.S. Cl. X.R.

137—315; 251—173, 306, 308, 315

———— DETACH HERE BEFORE MAILING THE TYPED CERTIFICATE TO THE PATENT OFFICE ————

UNITED STATES PATENT OFFICE
CERTIFICATE OF CORRECTION

Patent No. 3,528,448                    Dated September 15, 1970

Inventor(s) John B. Urban

It is certified that error appears in the above-identified patent and that said Letters Patent are hereby corrected as shown below:

Column 10, line 5 (Claim 9), after "which" insert --fluid--;

Column 10, line 5 (Claim 9), change "flow" to --flows--;

Column 10, line 5, (Claim 9), change "is" to --in--;

Column 10, line 9 (Claim 9), change "consrtuction" to --construction--;

Column 10, line 20 (Claim 9), change "quater" to --quarter--;

Column 10, line 34 (Claim 9), change "scrapiig" to --scraping--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents